United States Patent

Prinzler

Patent Number: 5,682,965
Date of Patent: Nov. 4, 1997

[54] BRAKE ACTUATOR HAVING A HYDRAULIC TRANSMISSION

[75] Inventor: Hubertus Prinzler, Langenhagen, Germany

[73] Assignee: Continental Aktiengesellschaft, Hanover, Germany

[21] Appl. No.: 694,747

[22] Filed: Aug. 9, 1996

[30] Foreign Application Priority Data

Aug. 12, 1995 [DE] Germany ............... 195 29 791.1

[51] Int. Cl.$^6$ ............... F16D 55/18; B60T 8/42
[52] U.S. Cl. ............... 188/72.4; 188/158; 303/115.2
[58] Field of Search ............... 188/72.1, 72.4, 188/106 P, 158, 162; 303/3, 15, 20, 115.1, 115.2

[56] References Cited

U.S. PATENT DOCUMENTS

| | | |
|---|---|---|
| 3,548,989 | 12/1970 | Root . |
| 4,435,021 | 3/1984 | Hoenick ............... 188/72.4 |
| 4,785,918 | 11/1988 | Biamino ............... 188/72.4 |
| 4,809,824 | 3/1989 | Fargier et al. ............... 188/72.1 |
| 5,143,429 | 9/1992 | Higashimata et al. ............... 303/115.2 |
| 5,152,588 | 10/1992 | Bright et al. ............... 188/162 |
| 5,219,049 | 6/1993 | Unterborn ............... 188/162 |
| 5,219,214 | 6/1993 | Savage et al. ............... 188/162 |
| 5,302,008 | 4/1994 | Miyake et al. ............... 188/162 |
| 5,348,123 | 9/1994 | Takahashi et al. ............... 188/72.1 |

FOREIGN PATENT DOCUMENTS

| | | |
|---|---|---|
| 0202738 | 4/1959 | Austria . |
| 0286504 | 10/1988 | European Pat. Off. . |
| 2001258 | 7/1971 | Germany . |
| 2636607 | 2/1977 | Germany . |
| 4229042 | 3/1993 | Germany . |
| 2006901 | 5/1979 | United Kingdom . |
| 2012895 | 8/1979 | United Kingdom . |

*Primary Examiner*—Robert J. Oberleitner
*Assistant Examiner*—Chris Schwartz
*Attorney, Agent, or Firm*—Walter Ottesen

[57] ABSTRACT

The invention is directed to a brake actuator of a vehicle which provides for a hydraulic reset in such a manner that a defined distance is always present between the brake lining 26 and the brake disc in the rest position of the friction brake. The brake actuator includes an electric motor 2, a hydraulic transmission 16 having a hydraulic chamber 22 with a first hydraulic piston 14 and a second hydraulic piston 18 and a second hydraulic cylinder 20. The brake actuator also includes a spindle unit (8, 10) located between an electric motor 2 and the hydraulic transmission 16. A further hydraulic chamber in the form of a readjusting chamber 28 is also provided. This additional chamber is closed off with a compensating piston movable relative to the ambient. The additional chamber 28 is connected to the first hydraulic chamber 22 via an opening 44 located in the second hydraulic piston 18. The opening 44 is provided with a check valve to permit flow to the pressure chamber 22. In the event of an exchange of the brake lining, the first hydraulic piston 14 is driven back so far that it clears an opening 40 of a reset channel 36 located between the pressure chamber 22 and the readjusting chamber 28. A further check valve 38 secures the reset channel 36 with respect to the readjusting chamber 28.

6 Claims, 2 Drawing Sheets

BRAKE ACTUATOR HAVING A HYDRAULIC TRANSMISSION

FIELD OF THE INVENTION

The invention relates to a brake actuator having a hydraulic transmission and including a drive unit in the form of an electric motor, a converting device for converting the rotational movement of the electric motor into a linear movement and a hydraulic transmission for transmitting the linear movement of the converting device to a friction lining of a brake.

BACKGROUND OF THE INVENTION

German patent publication 4,229,042 discloses such a brake actuator which is provided with an electric motor and a threaded spindle. The threaded spindle is driven by the motor and the spindle nut is connected to a first hydraulic piston operatively connected to a hydraulic chamber. A second hydraulic piston operates on a friction lining for carrying out the braking action.

A brake actuator is disclosed in U.S. patent application Ser. No. 08/653,132, filed May 24, 1996, which is characterized by a function reversal of the spindle compared to the brake actuator shown in German patent publication 4,229, 042. In the brake actuator disclosed in the U.S. patent application Ser. No. 08/653,132, it is not the spindle rod which is directly connected to the drive motor as is conventional; instead, the spindle nut is fixedly mounted on the motor shaft. The threaded spindle or spindle rod is instead fixedly connected to the primary piston of a downstream hydraulic transmission.

Brake linings or friction linings are subjected to wear. During operation of the friction brake, the friction surface is slowly worn down. This increases the distance between the brake lining and the brake disc. The brake must continuously or at least from time to time be readjusted in order to avoid allowing the distance between the lining and the brake disc to become so great that it cannot be bridged. A readjusting possibility of this kind is not provided in the above-mentioned brake actuating arrangements.

SUMMARY OF THE INVENTION

It is an object of the invention to provide a hydraulic readjustment for a friction brake wherein a defined spacing of the lining from the brake disc is always ensured in the non-braking state.

The invention is a brake actuator for a vehicle brake having a brake pad defining a friction lining and a brake disc or the like for coacting with the brake pad. The brake actuator includes: a frame; an electric motor having a rotor rotatably mounted in the frame and the rotor defining an axis of rotation; a spindle assembly for converting the rotational movement of the rotor into a linear movement along the axis; the spindle assembly including: a threaded member fixedly connected to the rotor so as to rotate therewith; and, a spindle rod threadably engaged with the threaded member; rotation restraining means for preventing the spindle rod from rotating when the threaded member is rotated thereby causing the spindle rod to execute the linear movement along the axis; a hydraulic transmission for transmitting the linear movement to the brake pad; the hydraulic transmission including a first hydraulic piston; an intermediate cylinder/piston unit defining a first hydraulic cylinder for accommodating the first hydraulic piston therein and for defining a second hydraulic piston; a second hydraulic cylinder accommodating the second hydraulic piston therein and being connected to the brake pad; the first piston, the intermediate cylinder/piston unit and the second hydraulic cylinder conjointly defining a first chamber containing hydraulic fluid; the first hydraulic piston being connected to the spindle rod so as to be movable along the axis with the spindle rod to transmit force to the second hydraulic cylinder via the hydraulic fluid; and, the second hydraulic cylinder being movably mounted on the frame for moving the brake pad into contact engagement with the brake disc in response to the force; a compensating piston mounted so as to be movable relative to the ambient; the compensating piston and the intermediate cylinder/piston unit conjointly defining a second chamber containing a further amount of the hydraulic fluid; the intermediate cylinder/piston unit defining a valve opening interconnecting the first and second chambers; a valve body mounted in the valve opening; and, the valve body and the valve opening conjointly defining a check valve to allow the hydraulic fluid to pass from the second chamber into the first chamber.

When releasing the brake, hydraulic fluid can pass through the check valve from the readjusting chamber (the second chamber) into the pressure chamber (the first chamber) to the extent that brake lining wear must be compensated. With a readjustment of this kind, the condition is prevented that the spacing between the brake lining and the brake disc becomes so great that it cannot be bridged. Here, the check valve does not permit the liquid to again return from the pressure chamber into the readjusting chamber when the first hydraulic piston (plunger) is moved forwardly.

The first hydraulic cylinder is a structure fixed to the housing and provided with a hollow shaft to define the first hydraulic cylinder. The first hydraulic cylinder has a T-shaped configuration when viewed in longitudinal section. This first hydraulic cylinder functions simultaneously as a second hydraulic piston. One component less is needed because of this joining of two functions.

The second hydraulic cylinder has a pot-shaped configuration and is axially displaceable relative to the second hydraulic piston.

Since the first and second hydraulic pistons or first and second hydraulic cylinders are arranged coaxially with respect to each other, an extremely short overall structural length results. This is especially advantageous because the space available in the region of the wheel brakes is limited.

A further advantage of the coaxial arrangement of the two cylinders is that a large translation perforce results.

To simplify assembly and for changing a brake lining, the first hydraulic piston (plunger) is moved back so far that it clears the opening of a reset channel located between the pressure chamber and the readjusting chamber. The reset channel is protected relative to the readjusting chamber by a further check valve.

The reset channel (the reset bore) can be omitted when the first check valve is configured in such a manner that it easily opens in a pressureless state and that it closes immediately when there is a certain overpressure; that is, this check valve closes immediately when the plunger is driven forwardly by the motor and causes a pressure buildup. When changing a brake lining, if one would manually or with a mechanism press back the lining support quasi-statically, then the check valve remains open; that is, when a certain pressure difference or a certain flow velocity is exceeded in this channel, then the check valve closes suddenly. On the other hand, when this difference pressure is not exceeded, the check valve remains open, that is, it is possible to pump the hydraulic fluid from the pressure chamber again into the compensating chamber by a slow, quasi-static return pressing of the hydraulic cup or the pressure cup. In this way, the function of the channel can be integrated into the forward check valve because, in the quasi-pressureless state or for a low pressure difference between pressure chamber and compensating chamber, this valve remains partially open (for example, by a weak spring) and closes immediately when there is a pressure buildup.

The first hydraulic piston (plunger) is reliably sealed with the aid of a piston ring relative to the cylindrical inner surface of the first hydraulic cylinder. The second hydraulic piston is reliably sealed relative to the inner surface of the second hydraulic cylinder likewise with the aid of a piston ring. And, the compensating piston is reliably sealed relative to the outer surface of the first hydraulic piston as well as relative to the inner surface of the second hydraulic cylinder likewise with the aid of piston rings.

The readjustment according to the invention takes place automatically with each braking operation. The components required for the readjustment are completely integrated into the hydraulic wheel brake actuator whereby a closed, locally limited hydraulic system results. Because of the readjusting chamber acting as a "supply vessel", extended maintenance intervals can be scheduled with respect to the hydraulic liquid.

BRIEF DESCRIPTION OF THE DRAWINGS

The invention will now be described with reference to the drawings wherein.

DESCRIPTION OF THE PREFERRED
EMBODIMENTS OF THE INVENTION

Figure 2:
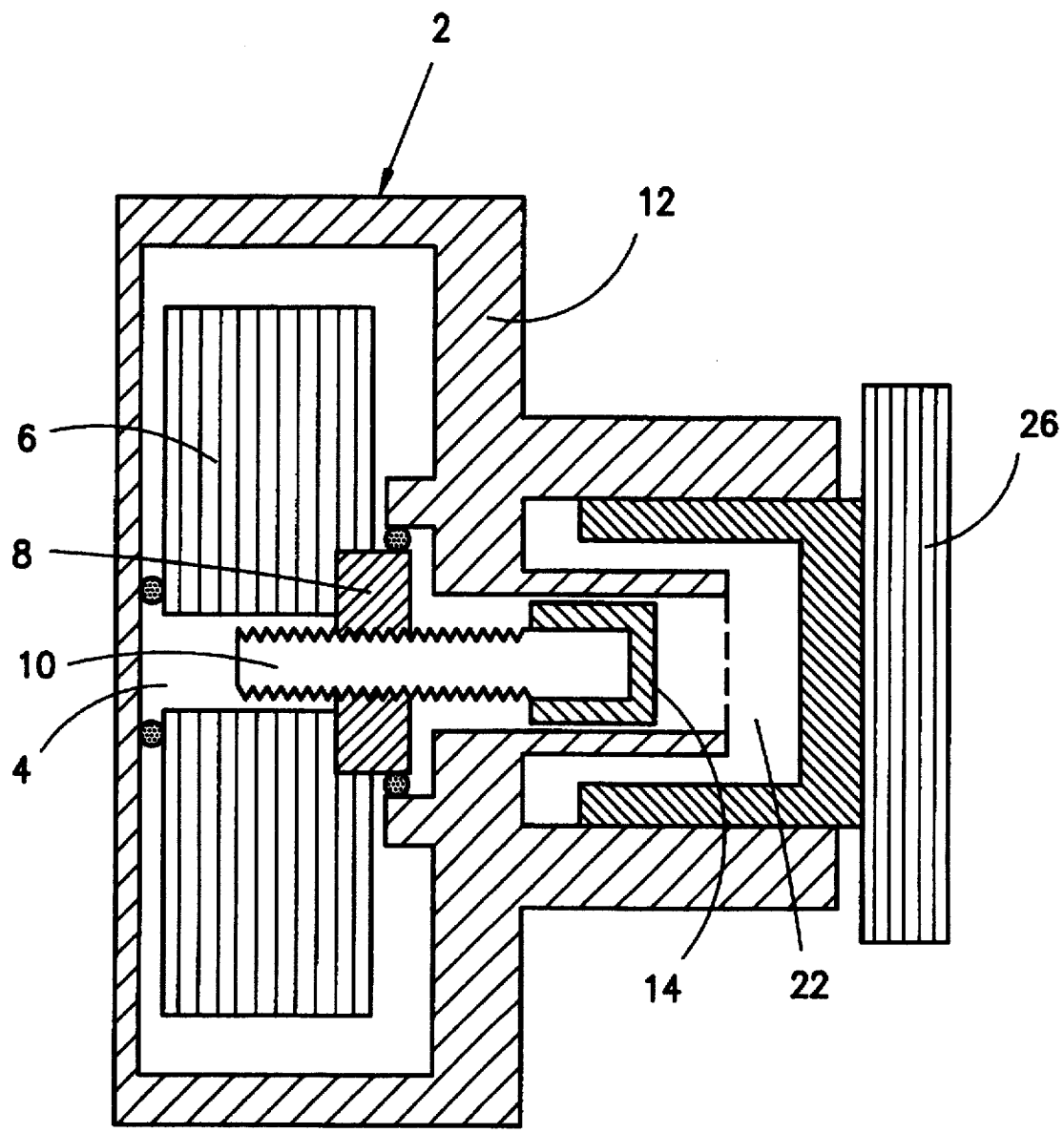

A brake actuator having hydraulic components according to the invention includes an electric motor 2 preferably having a hollow shaft 4, and a spindle unit (8, 10) connected to the motor 2. The spindle unit (8, 10) includes a spindle nut 8 and a spindle rod 10 and the spindle nut 8 is operatively connected to the rotor 6 of the motor 2. For example, this operative connection can be established in that the spindle nut 8 is flange connected directly and coaxially to the rotor 6 of the motor 2 so that the nut 8 rotates with the rotor. This is shown in the embodiment of FIG. 2.

The spindle nut 8 rotates with the rotor 6 of the motor 2 and is threadably engaged with the spindle rod 10 in order to drive the latter. The spindle rod 10 is displaceable in the longitudinal direction but is restrained so that it cannot rotate relative to the housing 12 of the brake actuator. This restraint can, for example, be provided in the manner shown in FIGS. 2 of U.S. patent application Ser. No. 08/653,132, filed May 24, 1996, and incorporated herein by reference. The spindle rod 10 is either fixedly connected to a first hydraulic cylinder (plunger) 14 or a functional unit consisting of spindle rod 10 and the first hydraulic piston 14 is provided.

Figure 1:
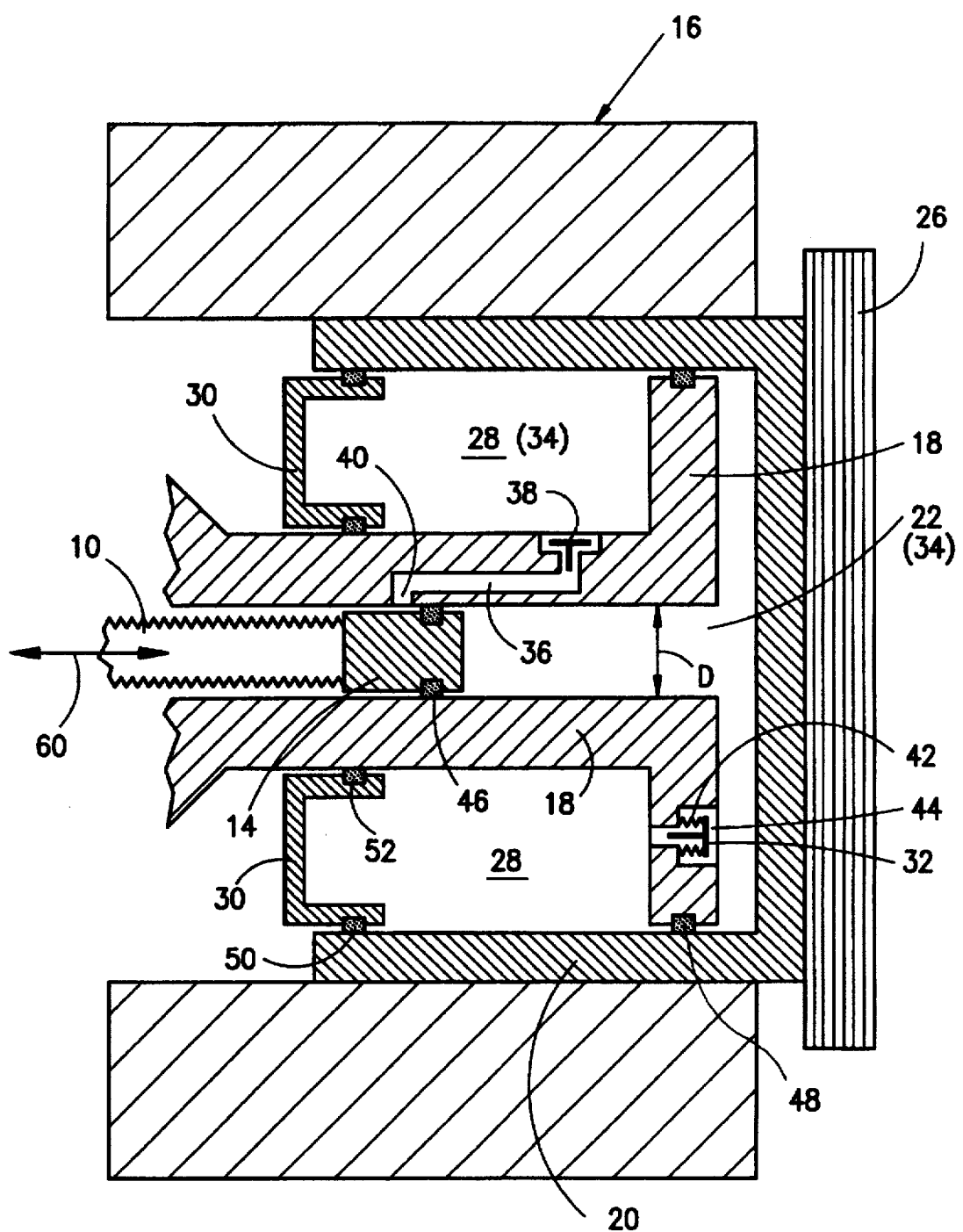
FIG. 1 is a longitudinal section view taken through a hydraulic component of a brake actuator according to the invention; and, FIG. 2 shows a section view taken through a brake actuator having a hydraulic transmission corresponding to the state of the art.

Referring to FIG. 1, the first hydraulic piston 14 is part of a hydraulic transmission 16. The hydraulic transmission 16 further includes a first hydraulic cylinder 18 which, in the present embodiment, simultaneously defines a second hydraulic piston 18. This first hydraulic cylinder (second hydraulic piston) 18 is fixedly mounted to the housing of the brake actuator. A hydraulic chamber (pressure chamber) 22 is enclosed by a second longitudinally-displaceable hydraulic cylinder 20. The hydraulic chamber 22 is, on the one hand, delimited by the first hydraulic piston (plunger) 14 and, on the other hand, by the second hydraulic piston 18 (which is simultaneously the first hydraulic cylinder 18).

The end face of the second longitudinally-displaceable hydraulic cylinder 20 is closed. A brake lining 26 is attached to the end face of hydraulic cylinder 20 as shown.

Conventional brake actuators can have a hydraulic transmission wherein two hydraulic cylinders and two hydraulic pistons, respectively, are required. In contrast to conventional brake actuators of this kind, in the brake actuator of the invention, the first hydraulic cylinder 18 is identical to the second hydraulic piston 18 so that only one (first) hydraulic piston (plunger) 14 and one (second) pot-shaped hydraulic cylinder 20 are additionally required.

The first hydraulic piston 14 moves within the combined first hydraulic cylinder/second hydraulic piston 18 and the second hydraulic cylinder 20 moves coaxially to the first hydraulic piston 14. The second hydraulic cylinder 20 is pushed pot-like over the second hydraulic piston 18. Because of the coaxial configuration, the diameter of the second hydraulic piston 18 (that is, the diameter of the second hydraulic cylinder 20) is perforce greater than the diameter of the first hydraulic piston (plunger) 14 (that is, the diameter D of the first hydraulic cylinder 18) whereby a force translation results.

The adjusting mechanism provided by the hydraulic components in accordance with the invention is provided within the pot-shaped configured second hydraulic cylinder 20 and is defined therein by a further hydraulic chamber, namely, the so-called readjusting chamber 28. This readjusting chamber 28 is, on the one hand, delimited by the rear side of the second hydraulic piston 18 and, on the other hand, relative to the ambient or the first hydraulic cylinder 18 by a compensating piston 30.

The readjusting chamber 28 communicates with the pressure chamber 22 via an opening 44. The opening 44 is located in the second hydraulic piston 18 and is provided with a first check valve 32. This check valve 32 opens as soon as the first hydraulic piston 14 is driven rearwardly if the second hydraulic cylinder 20 is not made to follow by the same amount. In this case, hydraulic liquid 34 flows from the readjusting chamber 28 into the pressure chamber 22. At the same time, the compensating piston 30 plunges into the readjusting chamber 28 in correspondence to the loss of volume.

Furthermore, a reset channel 36 having a further check valve 38 is disposed in the wall of the first hydraulic cylinder 18 between pressure chamber 22 and readjusting chamber 28. The additional or second check valve 38 is configured so that flow is in the direction toward the readjusting chamber 28. In the normal rest position and during operation of the brake, the opening 40 of the reset channel 36 is closed by the hydraulic piston (plunger) 14 which is moved forward with the spindle rod 10. The opening 40 leads into the pressure chamber 22.

The first hydraulic piston (plunger) 14 is reliably sealed with the aid of piston ring 46 relative to the cylindrical inner surface of the first hydraulic cylinder 18. The second hydraulic piston 18 is reliably sealed relative to the inner surface of the second hydraulic cylinder 20 with the aid of piston ring 48. And, the compensating piston 30 is reliably sealed relative to the outer surface of the first hydraulic cylinder 18 by piston ring 52 and relative to the inner surface of the second hydraulic cylinder by piston ring 50.

The operation of the hydraulic component with the adjusting mechanism according to the invention will now be described.

In the rest position, the same fluid pressures (ambient pressures) are present in the pressure chamber 22 and in the readjusting chamber 28. The arrow 60 indicates the movement of the spindle rod 10 and piston 14.

When the braking operation is initiated, the plunger piston 14 is moved forward by the motor 2 via the spindle unit (8, 10) and the corresponding braking pressure is built up in the pressure chamber 22. The check valve 32, which is located between the pressure chamber 22 and the readjusting chamber 28, prevents an equilibrium of pressure between these two regions. The second hydraulic cylinder 20 having the brake lining 26 is moved forward by a specific displacement in correspondence to the pressure in the pressure chamber 25 and the counterforce between the brake lining 26 and the brake disc (not shown). When the brake is released, the hydraulic cylinder 20 moves back because of elasticity and disc impact. In addition, the spindle rod 10 is driven back by the motor 2 into its zero position and takes the hydraulic piston 14 into this defined zero position because the hydraulic piston 14 is fixedly connected to the spindle rod.

If lining wear has occurred during the braking operation, a pressure equilibrium between the pressure chamber 22 and the readjusting chamber 28 is already attained before the hydraulic piston 14 is driven back to its zero position. In this case, and when there is a further pullback of the hydraulic piston 14 into its zero position, a pressure drop occurs between the readjusting chamber 28 and the pressure chamber 22 so that the fluid 34 can flow through the check valve 32 from the readjusting chamber 28 into the pressure chamber 22. A compensating piston 30 which can compensate for the volume difference is mounted in the readjusting chamber 28 because a volume difference results between the pressure chamber 22 and the readjusting chamber 28 because of the readjustment. With the next actuation of the brake, more fluid 34 is available in the pressure chamber 22 in correspondence to the readjustment and the hydraulic cylinder 20 has a new start position. The zero position of the hydraulic piston 14, however, remains the same because the hydraulic piston 14 is fixedly connected to the spindle rod 10.

In summary, the readjustment of the brake actuator of the invention is effected in that the hydraulic cylinder 20 releases from the brake disc because of elasticity and an impact blow imparted by the brake disc; whereas, the hydraulic piston 14 is always driven back into a defined zero position by the spindle rod 10 independently of this readjustment. The pressure drop needed for the readjustment is developed because of this "independence" between hydraulic piston 20 and hydraulic piston 14 when the latter is driven back.

Fluid 34 must reach the readjusting chamber 28 from the pressure chamber 22 in the event of an exchange of the brake lining 26. For this purpose, the piston 14 is driven rearwardly past the zero or start position shown in FIG. 1 by means of the spindle rod 10 until the piston 14 clears the opening 40 of the reset channel 36. By pressing back the hydraulic cylinder 20, the fluid 34 flows from the pressure chamber 22 via the reset channel 36 into the readjusting chamber 28.

For the purpose of facilitating an exchange of brake lining, and in lieu of a reset channel 36, the first check valve 32 can be equipped with a weak spring 42. By means of this spring 42, the check valve 32 remains open for quasi-static flow conditions until there is a certain overpressure. However, if a predetermined difference pressure or a certain flow velocity is exceeded, then the check valve 32 closes suddenly.

An embodiment is also conceivable wherein the plunger is not seated directly on the wheel brake and the readjustment is, by itself, integrated into the wheel brake.

It is understood that the foregoing description is that of the preferred embodiments of the invention and that various changes and modifications may be made thereto without departing from the spirit and scope of the invention as defined in the appended claims.

What is claimed is:

1. A brake actuator for a vehicle brake having a brake pad defining a friction lining and a brake disc for coacting with the brake pad, the brake actuator comprising:

a frame;

an electric motor having a rotor rotatably mounted in said frame and said rotor defining an axis of rotation;

a spindle assembly for converting the rotational movement of said rotor into a linear movement along said axis;

said spindle assembly including: a threaded member fixedly connected to said rotor so as to rotate therewith; and, a spindle rod threadably engaged with said threaded member;

rotation restraining means for preventing said spindle rod from rotating when said threaded member is rotated thereby causing said spindle rod to execute said linear movement along said axis;

a hydraulic transmission for transmitting said linear movement to said brake pad;

said hydraulic transmission including a first hydraulic piston;

an intermediate cylinder/piston unit defining a first hydraulic cylinder for accommodating said first hydraulic piston therein and for defining a second hydraulic piston;

a second hydraulic cylinder accommodating said second hydraulic piston therein and being connected to said brake pad;

said first piston, said intermediate cylinder/piston unit and said second hydraulic cylinder conjointly defining a first chamber containing hydraulic fluid;

said first hydraulic piston being connected to said spindle rod so as to be movable along said axis with said spindle rod to transmit force to said second hydraulic cylinder via said hydraulic fluid; and, said second hydraulic cylinder being movably mounted on said frame for moving said brake pad into contact engagement with said brake disc in response to said force;

a compensating piston mounted so as to be movable relative to said first hydraulic cylinder;

said compensating piston and said intermediate cylinder/piston unit conjointly defining a second chamber containing a further amount of said hydraulic fluid;

said intermediate cylinder/piston unit defining a valve opening interconnecting said first and second chambers;

a valve body mounted in said valve opening; and, said valve body and said valve opening conjointly defining a check valve to allow the hydraulic fluid to pass from said second chamber into said first chamber.

2. The brake actuator of claim 1, said intermediate cylinder/piston unit being a T-shaped structure fixedly connected to said frame; said T-shaped structure having a hollow shaft along said axis to define said first hydraulic cylinder; said T-shaped structure further having an annular flange to define said second hydraulic piston; and, said second hydraulic cylinder having a pot-shaped configuration and being displaceable along said axis and relative to said annular flange.

3. The brake actuator of claim 1, said check valve being a first check valve; and, said brake actuator further comprising: a reset channel formed in said intermediate cylinder/piston unit between said first and second chambers; a second check valve for blocking said second chamber relative to said first chamber; said reset channel having an outlet in said first hydraulic cylinder; and, said first hydraulic piston being movable along said axis in said first hydraulic cylinder from a first set of positions wherein said first hydraulic piston closes off said outlet to a reset position wherein said outlet is cleared thereby permitting said first chamber to communicate with said second chamber via said reset channel.

4. The brake actuator of claim 1, said check valve including a spring for biasing said valve body so as to slightly open said check valve when there is a zero pressure difference between said first and second chambers and to immediately close said check valve when there is a defined overpressure between said first andand second chambers.

5. The brake actuator of claim 2, said first hydraulic cylinder defining a first inner surface; first sealing means for sealing said first piston relative to said first inner surface; said second hydraulic cylinder having a second inner surface; second sealing means for sealing said second hydraulic piston relative to said second inner surface; said intermediate cylinder/piston unit having an outer surface; third sealing means for sealing said compensating piston relative to said outer surface; and, fourth sealing means for sealing said compensating piston relative to said second inner surface.

6. The brake actuator of claim 5, each of said sealing means being a piston ring.

\* \* \* \* \*